(12) United States Patent
Rychlik et al.

(10) Patent No.: US 9,092,358 B2
(45) Date of Patent: Jul. 28, 2015

(54) MEMORY MANAGEMENT UNIT WITH PRE-FILLING CAPABILITY

(75) Inventors: Bohuslav Rychlik, San Diego, CA (US); Thomas Andrew Sartorius, Raleigh, NC (US); Michael William Morrow, Cary, NC (US); Raymond P. Palma, Raleigh, CA (US)

(73) Assignee: QUALCOMM Incorporated, San Diego, CA (US)

( * ) Notice: Subject to any disclaimer, the term of this patent is extended or adjusted under 35 U.S.C. 154(b) by 639 days.

(21) Appl. No.: 13/371,506

(22) Filed: Feb. 13, 2012

(65) Prior Publication Data

US 2012/0226888 A1   Sep. 6, 2012

Related U.S. Application Data

(60) Provisional application No. 61/448,839, filed on Mar. 3, 2011.

(51) Int. Cl.
   *G06F 13/00* (2006.01)
   *G06F 13/28* (2006.01)
   *G06F 12/10* (2006.01)

(52) U.S. Cl.
   CPC .... *G06F 12/1027* (2013.01); *G06F 2212/6026* (2013.01); *G06F 2212/6028* (2013.01); *G06F 2212/654* (2013.01)

(58) Field of Classification Search
   CPC ............. G06F 12/1027; G06F 2212/6028; G06F 2212/654
   See application file for complete search history.

(56) References Cited

U.S. PATENT DOCUMENTS 6,628,294 B1   9/2003   Sadowsky et al.
6,976,147 B1   12/2005   Isaac et al.
(Continued)

FOREIGN PATENT DOCUMENTS

EP   1826676 A1   8/2007
JP   2007233615 A   9/2007
(Continued)

OTHER PUBLICATIONS

Abhishek Bhattacharjee et al., "Inter-core cooperative TLB for chip multiprocessors", Proceedings of the Fifteenth Edition of Asplos on Architectural Support for Programming Languages and Operating Systems, ASPLOS '10, Jan. 1, 2010, p. 359, XP55025359, DOI: 10.1145/1736020.1736060 ISBN: 978-1-60-558839-1 abstract p. 361, left-hand column, line 38—p. 363, right-hand column, line 46 figures 2-6.

(Continued)

*Primary Examiner* — Eric S Cardwell
(74) *Attorney, Agent, or Firm* — Peter Michael Kamarchik; Nicholas J. Pauley; Joseph Agusta

(57) ABSTRACT

Systems and method for memory management units (MMUs) configured to automatically pre-fill a translation lookaside buffer (TLB) with address translation entries expected to be used in the future, thereby reducing TLB miss rate and improving performance. The TLB may be pre-filled with translation entries, wherein addresses corresponding to the pre-fill may be selected based on predictions. Predictions may be derived from external devices, or based on stride values, wherein the stride values may be a predetermined constant or dynamically altered based on access patterns. Pre-filling the TLB may effectively remove latency involved in determining address translations for TLB misses from the critical path.

39 Claims, 7 Drawing Sheets

(56) References Cited

U.S. PATENT DOCUMENTS

| | | | |
|---|---|---|---|
| 2006/0179236 A1* | 8/2006 | Shafi | 711/137 |
| 2006/0259735 A1 | 11/2006 | Anand et al. | |
| 2008/0276066 A1 | 11/2008 | Lee et al. | |
| 2010/0058026 A1 | 3/2010 | Heil et al. | |
| 2011/0010521 A1 | 1/2011 | Wang et al. | |
| 2011/0173397 A1* | 7/2011 | Boyle et al. | 711/137 |

FOREIGN PATENT DOCUMENTS

| | | |
|---|---|---|
| JP | 2008282396 A | 11/2008 |
| JP | 2012533135 A | 12/2012 |
| WO | 2011008702 A1 | 1/2011 |

OTHER PUBLICATIONS

Abhishek Bhattacharjee et al., "Shared last—Level TLBs for chip multiprocessors", 2011 IEEE 17th International Symposium on High Performance Computer Architecture, Feb. 1, 2011, pp. 62-63, XP55025358, DOI: 10.1109/HPCA.2011.5749717 ISBN: 978-1-42-449432-3 abstract p. 65, left-hand column, line 36—right-hand column, line 34 figures 1-2.

Calder B et al., "A decoupled predictor—directed stream prefetching architecture", IEEE Transactions on Computers, IEEE Service Center, Los Alamitos, CA YUS, vol. 52, No. 3, Mar. 1, 2003, pp. 260-276, XP011095846, ISSN: 0018-9340, DOI: 10.1109/TC.1183943 abstract p. 261, left-hand column, line 8—p. 266, right-hand column, line 28 figures 1-2.

International Search Report and Written Opinion—PCT/US2012/027739—ISA/EPO—May 8, 2012.

Kandiraju G B et al., "Going the Distance for Tlb Prefetching: An Application-Driven Study", Proceedings of the 29th International Symposium on Computer Architecture. ISCA 2002. Anchorage, Al, May 25-29, 2002; [International Symposium on Computer Architecture. (ISCA)], Los Alamitos, CA : IEEE Comp. Soc, US, May 25, 2002, pp. 195-206, XP001110058, DOI: 10.1109/ISCA.2002.1003578 ISBN: 978-0-7695-1605-9 Abstract p. 195, Right-Hand Column, Line 21—p. 199, Left-Hand Column, Line 32 Figures 1-6.

Saulsbury, A. et al., "Recency-Based TLB Preloading." ISCA '00 Proceedings of the 27th annual international symposium on Computer architecture. ACM New York, NY, USA © 2000. table of contents ISBN:1-58113-232-8 doi>10.1145/339647.339666, Dec. 31, 2000.

* cited by examiner

MEMORY MANAGEMENT UNIT WITH PRE-FILLING CAPABILITY

CLAIM OF PRIORITY UNDER 35 U.S.C. §119

The present Application for Patent claims priority to Provisional Application No. 61/448,839 entitled "MEMORY MANAGEMENT UNIT WITH PRE-FILLING CAPABILITY" filed Mar. 3, 2011, and assigned to the assignee hereof and hereby expressly incorporated by reference herein.

FIELD OF DISCLOSURE

Disclosed embodiments are directed to memory management units (MMU) for managing translation of memory addresses from virtual to physical addresses. More particularly, exemplary embodiments are directed to efficient techniques, such as pre-filling, for management of translation caches, wherein the translation caches may be used for virtual-to-physical address translation.

BACKGROUND

Modern operating systems often use virtual memory schemes in order to maximize the use of physical storage space in processors. Virtual memory is well known in the art. Virtual memory can be addressed by virtual addresses. The virtual address space related to a program is conventionally divided into pages. Pages are blocks of contiguous virtual memory addresses. While programs may be written with reference to virtual addresses, a translation to physical address may be necessary for the execution of program instructions by processors. Page tables may be employed to map virtual addresses to corresponding physical addresses.

Memory management units (MMUs) are commonly used to handle translation of virtual addresses to physical addresses. MMUs may look up page table entries (PTEs) which include the virtual-to-physical address mappings, in order to handle the translation. Physical memory space may be managed by dynamically allocating and freeing blocks of the physical memory or data buffers. In this process of dynamic allocation and freeing, it is common for the free physical memory space to become fragmented, comprising non-contiguous free blocks. Thus, a contiguous range of virtual addresses may become mapped to several non-contiguous blocks of physical memory. Accordingly, the page table look up process, also known as "page table walk" may need to be performed frequently, as contiguous virtual addresses may not conveniently map to contiguous physical addresses. These frequent page table lookups may significantly impact performance.

One conventional technique to address the frequent page table lookups includes the use of a translation cache, also known as a translation lookaside buffer (TLB). A TLB may cache translations for frequently accessed pages in a tagged hardware lookup table. Thus, if a virtual address hits in a TLB, the corresponding physical address translation may be reused from the TLB, without having to incur the costs associated with a page table walk.

With reference to FIG. 1, a conventional implementation of a TLB is illustrated. As shown, TLB 100 is configured to translate a virtual address (VA) 102 to a physical address (PA) 104. The virtual addresses A, B, C, and D are stored in content addressable memory (CAM) 112. A portion of the virtual addresses form tags 110 which are compared against the virtual address 102 to determine if a translation for virtual address 102 is present in TLB 100. If there is a hit, then the corresponding physical address: P, Q, R, or S, is read out of random access memory (RAM) 106, using de-multiplexor logic 108, in order to form physical address 104. A virtual address, such as A, B, C, or D, along with its corresponding physical address translation, P, Q, R, or S, may combinedly be referred to as an entry in TLB 100.

Entries in a TLB, such as TLB 100, may be populated in several ways. The common criteria for evaluating fills, or updates, in a TLB include: when to fill a TLB entry; where in a TLB a new entry may be placed; and how many TLB entries may be filled during each update of the TLB. Two conventional techniques are known in the art for updating or filling TLP entries.

The first technique, referred to as "software fill" meets the above criteria for filling a TLB as follows: fills are performed pursuant to a fill command initiated in software; fills are performed at addresses specified by software; and conventionally, software fill applies to a single entry in the TLB.

The second technique, referred to as "demand fill" is usually employed in MMUs for central processing units (CPUs). Demand fill meets the criteria for filling a TLB as follows: fills are performed pursuant to a miss in the TLB; fills are performed at the address which caused the miss; and demand fill conventionally applies to a single entry in the TLB, corresponding to the address which caused the miss. One advantage of demand fill is that TLB entries are only filled as needed, pursuant to a miss. However, an accompanying disadvantage lies in that stalls are introduced to the TLB user every time the TLB is waiting for the required TLB entry to be filled.

Demand fill may be an adequate solution for CPUs because programs generally include a high degree of temporal locality, i.e. the same addresses are accessed close together in time. However, streaming accesses may sometimes not exhibit temporal locality. Streaming accesses may generally comprise sets of one or more accesses which may executed in a burst. For example, streaming accesses which may not exhibit a high degree of temporal locality may include accesses from multimedia accelerators (e.g. display engines), and accesses from CPUs during a memory copy. In contrast to reusing the same addresses, such streaming accesses lacking in temporal locality may be directed to a new address every time. Accordingly, demand fills may cause degradation in performance of TLBs. Such degradation may be particularly visible in MMUs designed for devices other than CPUs, such as System MMUs or input/output (I/O) MMUs.

With regard to accesses other than streaming accesses (referred to as "non-streaming accesses"), the size of the TLB may be increased in limited cases, to accomplish a reduction in TLB misses. However, for streaming accesses, increasing the TLB size does not accord the same benefit. In fact, even if theoretically, the TLB size was increased towards infinity, it can be shown in several cases that the TLB performance may continue to be severely degraded by misses and accompanying stalls.

Accordingly, there is a need in the art, particularly with respect to accesses without temporal locality, for TLB filling techniques which are not plagued by performance degradations caused by high miss rates.

SUMMARY

Exemplary embodiments are directed to systems and method for memory management units (MMUs) configured to automatically pre-fill a translation lookaside buffer (TLB)

with address translation entries expected to be used in the future, thereby reducing TLB miss rate and improving performance.

For example, an embodiment is directed to an MMU configured to automatically pre-fill a TLB with translation entries, wherein addresses corresponding to the pre-fill may be selected based on predictions. One or more embodiments may pre-fill TLB entries with a predetermined number of adjacent addresses beyond an address corresponding to a missing entry in the TLB. Embodiments may also pre-fill the TLB based on predictions derived from a hint address value received from an agent external to the MMU.

In exemplary embodiments TLB pre-fills may be performed based on a stride value, such that an entry is pre-fetched from an address formed from incrementing (or decrementing) an address of a missing entry with the stride value. The stride value may be predetermined and may further be programmed in software, and stored in a register. The stride value may also be dynamically computed by using stride predictor logic configured to analyze stride patterns formed by missing entries in the TLB.

Exemplary embodiments may also be directed to TLB pre-fills for multiple streaming accesses. Multiple streaming accesses may be derived from multiple external agents requiring streaming accesses from a system MMU, wherein the multiple streaming accesses may not share common attributes or stride values. Multiple stride predictors may be employed to support address translation needs of the multiple streaming accesses.

An exemplary embodiment is directed to a method of populating a translation lookaside buffer (TLB), the method comprising: receiving a first virtual address for translation to physical address by the TLB; and in a single burst, pre-filling the TLB with translations for a first stream of one or more pre-fill virtual addresses derived from the first virtual address.

Another exemplary embodiment is directed to an apparatus for populating a translation lookaside buffer (TLB), the apparatus comprising: logic configured to generate a first virtual address for translation to physical address by the TLB; and logic configured to pre-fill the TLB with translations for a first stream of one or more pre-fill virtual addresses derived from the first virtual address, in a single burst.

Another exemplary embodiment is directed to a method of populating a translation lookaside buffer (TLB), the method comprising: populating a first set of entries of the TLB with address translations for a first stream of virtual addresses generated at a first rate; and populating a second set of entries of the TLB with address translations for a second stream of virtual addresses generated at a second rate.

Another exemplary embodiment is directed to an address generation unit (AGU) comprising: logic configured to generate a first stream of virtual addresses at a first rate for translation in a translation lookaside buffer (TLB); and logic configured to generate a second stream of virtual addresses at a second rate for translation in the TLB.

Another exemplary embodiment is directed to a system for populating a translation lookaside buffer (TLB), the system comprising: means for receiving a first virtual address for translation to physical address by the TLB; and means for pre-filling the TLB with translations for a first stream of one or more pre-fill virtual addresses derived from the first virtual address, in a single burst.

Another exemplary embodiment is directed to a system for populating a translation lookaside buffer (TLB), the system comprising: means for populating a first set of entries of the TLB with address translations for a first stream of virtual addresses generated at a first rate; and means for populating a second set of entries of the TLB with address translations for a second stream of virtual addresses generated at a second rate.

Another exemplary embodiment is directed to a non-transitory computer-readable storage medium comprising code, which, when executed by a processor, causes the processor to perform operations for populating a translation lookaside buffer (TLB), the non-transitory computer-readable storage medium comprising: code for receiving a first virtual address for translation to physical address by the TLB; and code for pre-filling the TLB with translations for a first stream of one or more pre-fill virtual addresses derived from the first virtual address, in a single burst.

Another exemplary embodiment is directed to a non-transitory computer-readable storage medium comprising code, which, when executed by a processor, causes the processor to perform operations for populating a translation lookaside buffer (TLB), the non-transitory computer-readable storage medium comprising: code for populating a first set of entries of the TLB with address translations for a first stream of virtual addresses generated at a first rate; and code for populating a second set of entries of the TLB with address translations for a second stream of virtual addresses generated at a second rate.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
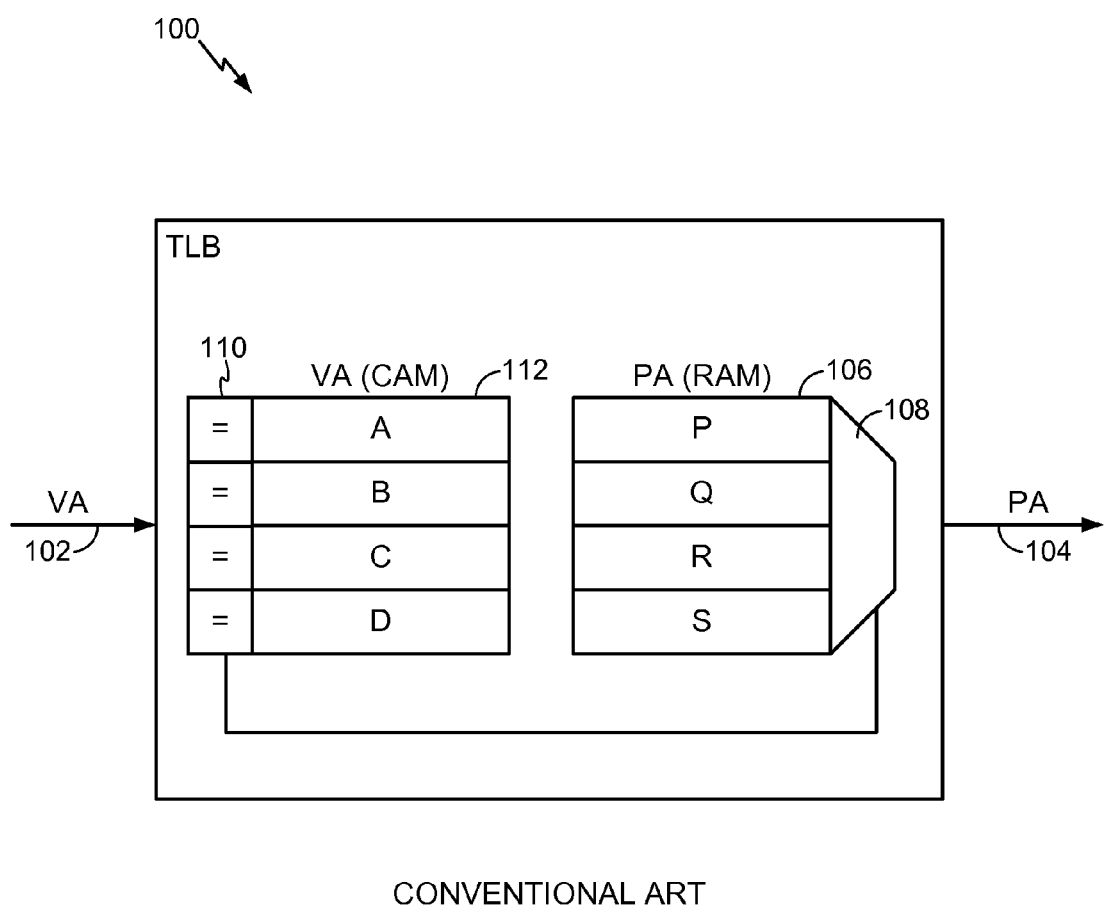
FIG. 1 illustrates a schematic representation of a conventional TLB.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary embodiments include TLB fill techniques which overcome several limitations of conventional TLB fill techniques. Such exemplary TLB fills may be performed by a memory management unit (MMU). For example, as compared to conventional techniques such as software fill and demand fill, exemplary TLB filling techniques may not be affected by high miss rates. Exemplary TLB fills may not need to wait for a software command or a TLB miss, but may predict TLB fills ahead of time and pre-fill the TLB ahead of time. In this manner, stalls may be avoided, and the time taken for page table walks for future accesses may be hidden and removed from critical paths. For example, TLB pre-fills may be performed while current entries in the TLB are being accessed, such that long delays are not incurred by initiating a TLB fill process after requirement for an address has been established pursuant to a miss. Such TLB pre-fills can be performed in several ways in exemplary embodiments.

One embodiment comprises a modification of conventional demand fill, referred to herein as "demand fill with spatial pre-fetch." In this embodiment, a number of entries that are filled in a TLB pursuant to a miss are increased beyond the single entry that is missing at the time of the miss. A number "N" of adjacent entries may be filled pursuant to a miss. In comparison with a conventional demand fill, a demand fill with spatial pre-fetch in exemplary embodiments may meet the criteria for evaluating fills in the TLB as follows: a fill may be performed pursuant to a TLB miss; the fill may be performed at the address that caused the miss; and up to N adjacent addresses that are adjacent to the address corresponding to the miss may be filled. As can be seen, one improvement over a conventional demand fill lies in predicting future fills and filling N adjacent addresses, ahead of time in the TLB.

Demand fill with spatial pre-fetch may take advantage of any existing spatial locality in addresses of a streaming access. As used herein, a streaming access or a stream may generally refer to a set of one or more accesses or transactions which may be performed in a single burst. Spatial locality generally refers to a property exhibited by addresses close to each other in the address space. In other words, adjacent addresses exhibit spatial locality. Accordingly, if a streaming access is likely to exhibit spatial locality, then pre-fetching adjacent addresses ahead of time will ensure that the pre-fetched data will be accessed in the TLB during future accesses, thus generating TLB hits.

The process of exploiting spatial locality in addresses may be analogous to increasing the cache line size of a conventional data cache, because a cache line usually comprises adjacent addresses. Thus, with regard to TLB fills, demand fill with spatial pre-fetch may take advantage of bus widths that are larger than the size of a page table entry (PTE). For example, more than one PTE can be fetched in a single cycle. By way of illustration, assume that PTEs are 32-bits wide. Suppose PTE2 is the third entry in a 128-bit aligned line, corresponding to a 128-bit wide data bus, and PTE2 corresponds to a demand fill. In this scenario, page table walk logic can be configured to fetch 3 more PTEs adjacent to PTE2 in the same duration of time that is required to fetch PTE2. Therefore, the set of adjacent PTEs: {PTE0, PTE1, PTE2, PTE3} may be fetched in a single access, instead of fetching PTE2 alone.

Another embodiment includes a TLB fill technique referred to herein as "stream pre-fill." Stream pre-fill may identify an address stream within a streaming access, and initiate a TLB fill ahead of the time when an entry in the address stream would be required. An aspect of stream pre-fill is to accomplish filling the TLB with the exact sequence of one or more entries that would have been filled pursuant to a conventional demand fill. However, a distinction over a conventional demand fill lies in that, stream pre-fill may be configured to initiate the TLB fills ahead of the time a demand fill may initiate the same TLB fills. Thus, stream pre-fills may effectively hide the latency incurred by page table walks pursuant to TLB misses in a conventional demand fill.

Stream pre-fill meets the criteria for evaluating fills in a TLB as follows: a TLB fill is performed as far in advance of a TLB miss, as required to effectively hide the latency incurred by page table walks; the TLB fills are performed for addresses that have been predicted to potentially miss, i.e. addresses that would have been encountered and missed in the course of a conventional demand fill; a stream pre-fill fills a single TLB entry at a time.

Exemplary embodiments may perform the prediction of addresses which will potentially miss in the TLB for stream pre-fill in one of several manners. One such embodiment includes receiving the prediction from an agent that is external to an exemplary MMU implementing the stream pre-fill. A pre-fill hint may be generated by the external agent. A first-in-first-out (FIFO) mechanism may be populated by the pre-fill hints. The MMU may be configured to receive the pre-fill hints from the pre-fill FIFO.

As an illustrative example, a display controller of a display unit may be configured to continuously scan across monotonically increasing addresses (virtual addresses). An address generation unit of the display controller may be configured to simultaneously generate a corresponding monotonically increasing set of page addresses. Usually, page sizes (for example 4 KB) are larger than individual accesses of the display controller (for example 128 B). As a result, several addresses generated by the address generation unit may share the same page, and thus a new page translation may not be required for each individual access. Accordingly, a stream pre-fill may need to generate a new prediction related to page address translation only on instances wherein the address generation unit traverses 4 KB page boundaries.

In an implementation of the above stream pre-fill technique for a display controller, one bit of the addresses generated by the address generation unit may be tracked. For example, the $12^{th}$ least significant bit, bit 12, may be indicative of a change in address on a 4 KB (4096 B or $2^{12}$ B) boundary. Accordingly, predictions may be triggered on strides of 4 KB as the bit 12 may change on every 4 KB stride. Alternatively, predictions may be configured to be triggered on multiples of 4 KB as the external agent may be traversing the address space on larger than 4 KB strides. In such a manner, predictions may be made sufficiently ahead of time in order to hide latency involved in making the predictions themselves. As an optional feature, transmission of addresses or pre-fill hints to the pre-fill FIFO may be truncated in order to conserve resources. Accordingly, in the above example, for a 4 KB page size, only the upper 20 bits of a 32-bit address, which has been shifted to a 4 KB granularity (e.g. by shifting out the least significant 12-bits) may need to be transmitted. Thus, the width of the pre-fill FIFO may be reduced by an amount of 12-bits.

As another implementation of stream pre-fill in an exemplary MMU, a stride value that is not limited to a page size may be used for prediction. For example, a stride value may be programmed by software, and may further be stored in a register in the MMU. Thus, if an external agent or other client of the MMU requests a particular address for translation, then the MMU may internally generate an address equivalent to the particular address incremented (or decremented) by the stride value. This internally generated address may be used as the prediction for stream pre-fill such that if the internally generated address is not currently in the TLB, the MMU may generate a pre-fill request for the internally generated address ahead of time. Thus, any delay associated with page table walks for the internally generated address may be hidden.

Yet another implementation of stream pre-fill involves dynamically detecting and altering stride values by using a stride predictor. For example, each TLB miss may be determined to be encountered at a fixed offset or stride value from a previous miss. This determination may be obtained from the stride predictor. The stride predictor may be configured to store the address of the latest or current TLB miss, a current stride value which may be initialized to a default value, and optional one or more bits associated with a predictor confidence value. Upon encountering the next TLB miss, the stride value may be updated with the difference in addresses between the next TLB miss and the stored current TLB miss; the address of the current TLB may be replaced with the next TLB miss; and the confidence value may be incremented. This process may be repeated, such that the currently stored stride value may be compared with an actual stride value based on difference in addresses between a currently stored TLB miss address and encountered next TLB miss addresses. If the stride values match, the currently stored stride value may be validated as a good predictor for future stride values; and correspondingly the confidence values may be incremented. Once confidence levels reach a predetermined level, the stride predictor may generate pre-fill requests for predicted addresses based on a currently stored TLB miss address and the currently stored stride value.

In the above implementation of stream pre-fill with dynamically determined stride values, the MMU may be further configured to distinguish between TLB entries which were filled based on a demand fill, and TLB entries which were filled by stream pre-fill. For example, TLB entries which were filled by stream pre-fill may be marked by a pre-fill indicator bit or populated in a selected section of the TLB designated as a "future TLB." The stride predictor may be configured to monitor both demand misses as well as pre-fill hits (marked by the pre-fill indicator or located in the future TLB portion). For purposes of calculating stride, both the demand misses as well as pre-fill hits may be treated as a miss. It will be recognized that if the pre-fill hits were not taken into account in such manner, then the stride predictor may not be accurate because a potential demand miss that has been pre-filled may generate a hit but the stride predictor would have overlooked this potential demand miss in its stride calculation because a hit would have been encountered.

Embodiments may also include logic configured to ensure that stream pre-fill using dynamically predicted stride values achieves a desired balance between pre-filling sufficiently in advance to hide latencies caused by TLB misses and not filling the TLB too far in advance such that the TLB may end up populated with too many unused pre-filled entries. One exemplary technique of achieving the desired balance may include tagging each entry in the TLB which has been populated by a pre-fill with an indicator bit. When such a tagged entry is accessed for the first time, the indicator bit may be cleared, and a pre-fill for the next address based on predicted stride values may be initiated. As an optional feature, the first entry in the TLB that is populated by a pre-fill may be established by software.

Figure 2A:
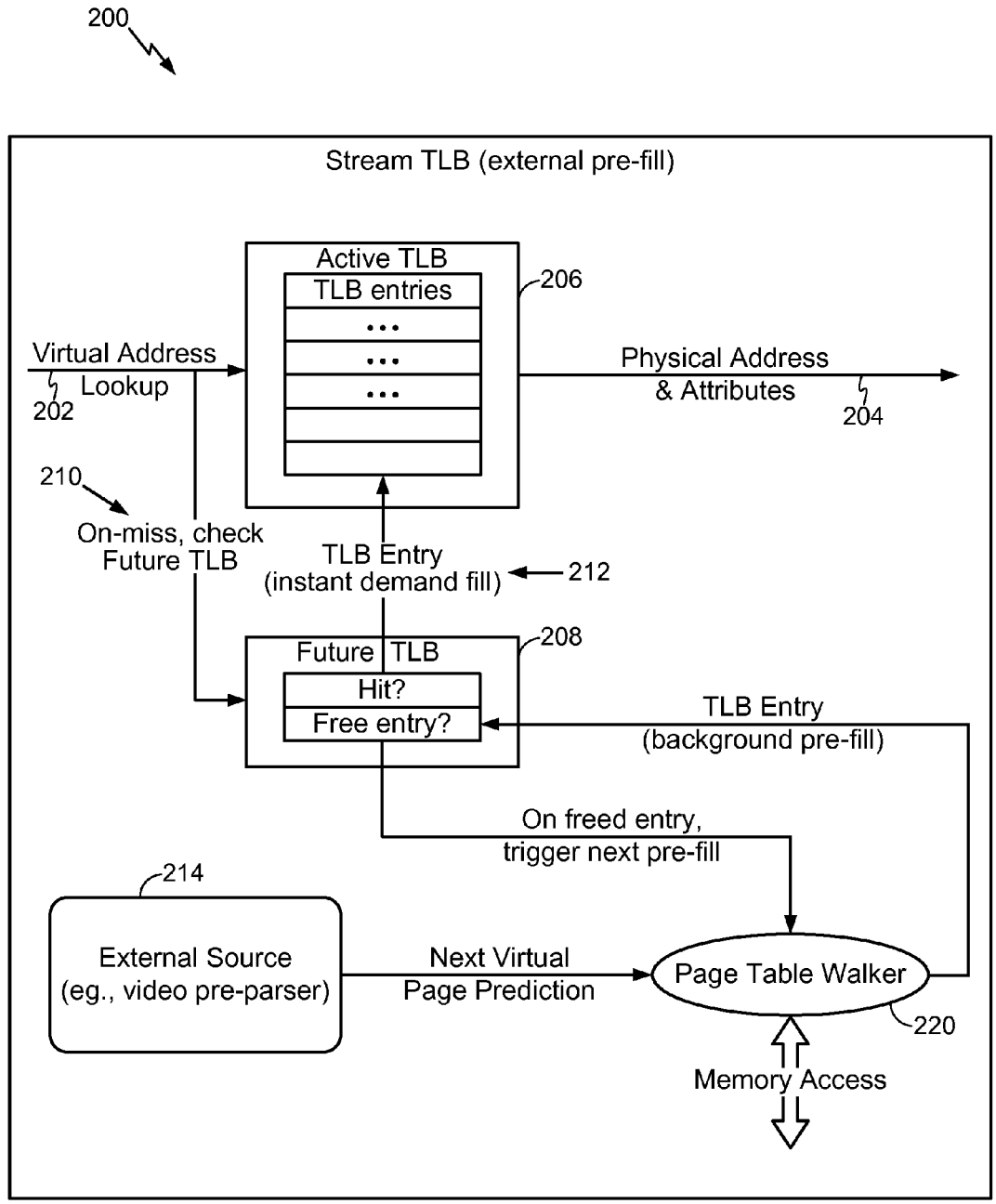
FIGS. 2A-B illustrate schematic representations of exemplary MMUs with active and future TLB classifications.
Figure 2B:
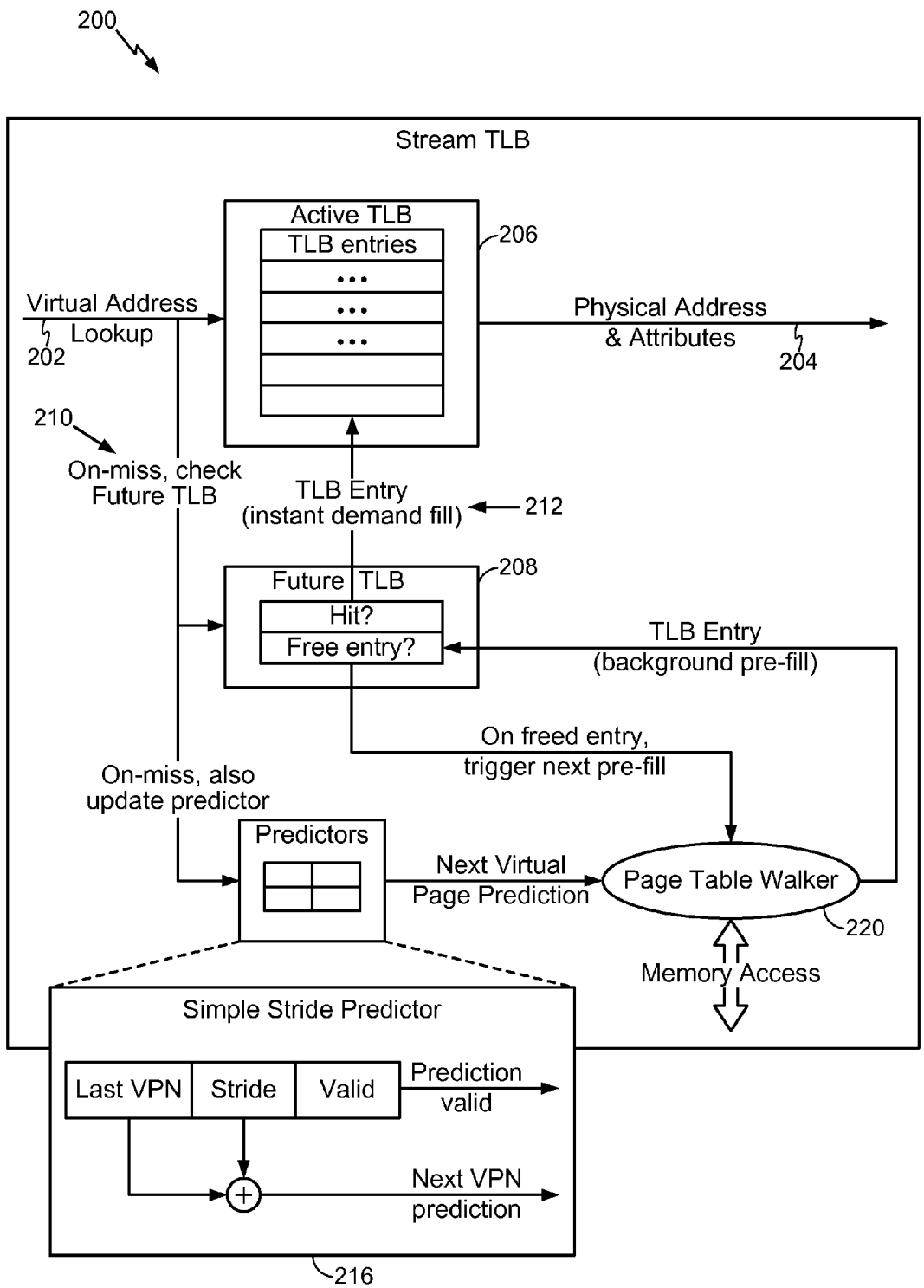

With reference now to FIGS. 2A-B, another exemplary technique for achieving the balance is illustrated with reference to TLB 200, wherein TLB 200 may be configured to translate virtual address 202 to physical address 204. TLB 200 may be partitioned into an active TLB 206 and a future TLB 208. While both active TLB 206 and future TLB 208 are accessed pursuant to an address translation request, only future TLB 208 is populated with pre-fills. Active TLB 206 and future TLB 208 may be accessed either simultaneously or in sequence. As illustrated by action 210 in FIG. 2A, misses in active TLB 206 may check future TLB 208 for the missing entry. Page table walker 220 may be activated to search for missing entries or for pre-filling future TLB 208. Further, hints from external source 214 may also be used for predictions of potential TLB fills, activating page table walker 220 ahead of time in order to hide the corresponding latency. Moreover, an address request that may give rise a hit in the future TLB may cause the hitting entry to migrate to the active TLB (as illustrated by action 212 in FIG. 2).

With reference to FIG. 2B, action 210 may be modified such that misses in active TLB 206 may check future TLB 208 for the missing entry, activate stride predictor 216 and thereby initiate a potential pre-fill to be populated in future TLB 208.

In one or more embodiments, the stride value may be programmable, such that a programmer may dynamically adjust the stride value for particular applications. Moreover, embodiments may also include stride values derived from hints received from external devices such as multimedia devices.

Other embodiments relating to stream pre-fills will now be described with reference to FIGS. 3A-B. As illustrated for example in FIGS. 3A-B, device 302 may be configured to access TLB 306 for translation of virtual addresses (VA) to physical addresses (PA) which correspond to memory 308. Device 302 may be any device which generates a demand stream of virtual addresses for translation in TLB 306. For example, device 302 may be a processor or a streaming device such as a display controller configured to read adjacent memory addresses in order to read out display data. Thus, device 302 may generate a demand stream corresponding to adjacent addresses in memory 308 in such examples. As shown, device 302 may include address generation unit (AGU) 304 for generating this demand stream.

In exemplary embodiments, AGU 304 may be additionally configured to also generate a pre-fill stream of virtual addresses in addition to the demand stream. The virtual addresses generated by AGU 304 for the pre-fill stream may be offset by a desired amount from the demand stream such that the pre-fill stream may include addresses that are ahead of the demand stream. For example, an address in a pre-fill stream may be ahead of an address in a demand stream by an offset value corresponding to a page size. The desired offset value may be positive or negative, and may be derived from a programmable register. In some embodiments, AGU 304 may be configured to generate a new address for the pre-fill stream only at page crossings. For example, if a page size is 4 KB, then AGU 304 may generate a new pre-fill address request every time the $12^{th}$ least significant bit of the demand stream toggles. Thus, AGU 304 may be configured to generate two distinct streams at two different rates. For example, a first stream (e.g. demand stream) may be generated at a first rate (e.g. corresponding to requests for adjacent memory addresses which may be generated every clock cycle); and a second stream (e.g. pre-fill stream) may be generated at a second rate (e.g. at every instance the demand stream traverses a page boundary). Thus, TLB 306 may be simultaneously populated by translation requests from both the first and the second streams. As described previously, indicators may be included to track entries of TL 306 populated by the first and the second stream, and the respective first and second rates of generation may be adjusted based on a desired balance between demand-based entries and pre-filled entries in TLB 306.

In some embodiments, the pre-fill stream may be designated as comprising pre-fill requests which are read-only requests, so as to avoid altering memory 308. In these embodiments, the device 302 may be configured to track outstanding demand requests and ignore data returned from memory device 308 for pre-fill requests. In some embodiments, device 302 may also cache pre-fill data returned from pre-fill requests, because it is known in advance that the pre-fill data would only be needed by a future demand request.

Figure 3A:
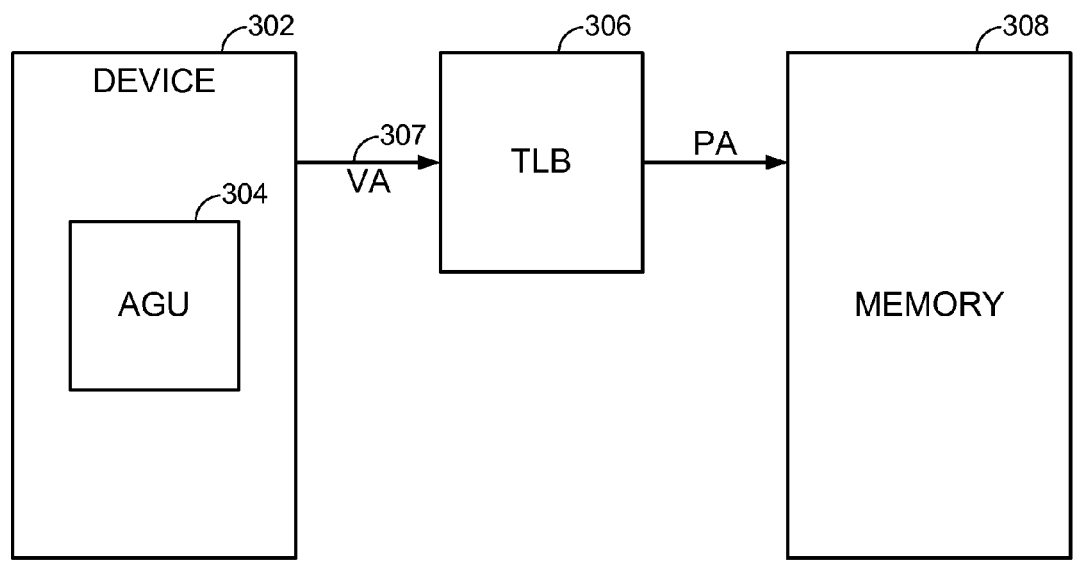
FIGS. 3A-B illustrate a system comprising an address generation unit for populating a TLB according to exemplary embodiments.
Figure 3B:
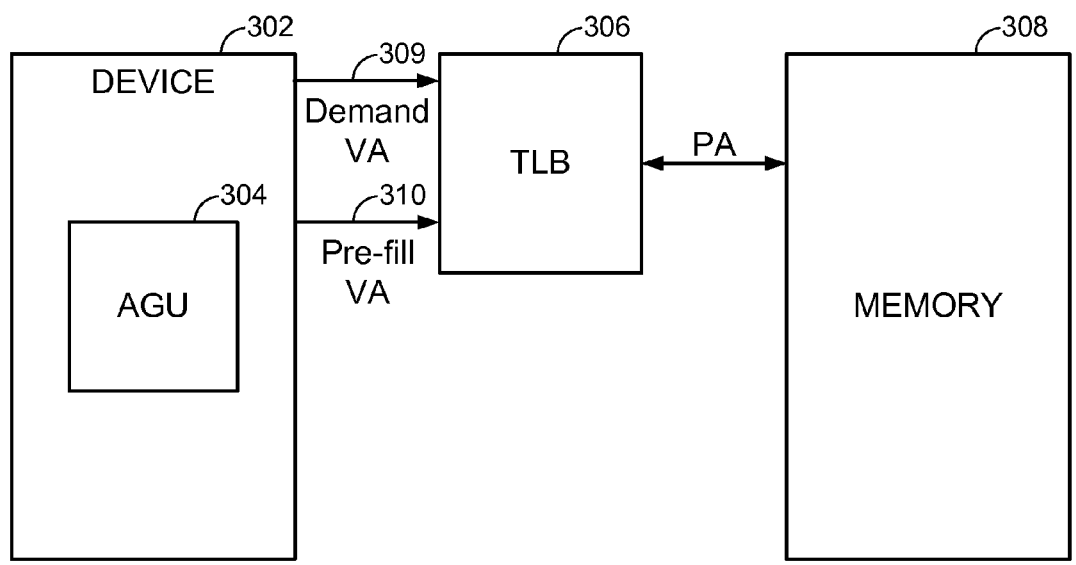

As shown in FIG. 3A, both the demand stream and the pre-fill stream may be communicated on a common request channel, channel 307 from device 302 to TLB 306. However, this configuration involving a common channel may cause pre-fill requests to block the progress of demand requests which are more time critical. In order to avoid such hindering of demand requests, the pre-fill requests may be demarcated with an indicator bit, thereby enabling TLB 306 to distinguish them from demand requests (read/write) to memory 308. TLB 306 may thus avoid forwarding additional read transactions to memory 308 as device 302 will not be expecting read data to be returned corresponding to pre-fill requests.

In some configurations involving common channel 307, the demand stream and the pre-fill stream may be logically separated by adopting a lower level link protocol. In operation such configurations may be logically equivalent to configuring separate channels for the demand stream and the pre-fill stream.

In further embodiments, separate channels may in fact be configured for the demand stream and the pre-fill stream. For example, with reference to FIG. 3B, separate channels, demand request channel 309 and pre-fill request channel 310 may be provided as shown for communication between device 302 and TLB 306. Such separate channels may reduce effects such as hindering of demand requests on common channel 307. Configuring separate channels may also avoid the need for an indicator bit to demarcate pre-fill requests, because such indication may be provided based on which channel a request is received from.

Referring back to FIG. 2A, it will be recognized that another configuration comprising separate channels for the demand stream and pre-fill stream is illustrated. The channel comprising virtual addresses 202 depicts a demand stream, while external source 214 configured for making predictions as previously noted, generates a pre-fill stream. Accordingly, it can be seen that the demand stream and the pre-fill stream may be generated from separate devices and need not be generated from the same device 302 as depicted in FIGS. 3A-B. For example, in the case of a video decode application, a external source 214 may be a frame pre-processing device configured to parse a data stream at a high speed, without performing a full decode on the data stream in order to determine the memory pages that would be invoked by a full frame decoder. The pre-processing device constituting external source 214 may run ahead of a full frame decoder device, wherein the pre-processing device may be able to generate pre-fill requests on behalf of the full frame decoder. By the time the full frame decoder may need to access the memory pages, these memory pages may already be pre-filled into the TLB (e.g. future TLB 208), thereby ensuring that the full frame decoder would not need to wait for TLB misses to be serviced.

Yet another embodiment includes a TLB fill technique referred to herein as "stream pre-fill with spatial pre-fetch." Essentially, stream pre-fill with spatial pre-fetch may fetch more than one entry on each fill of a stream pre-fill. Stream pre-fill with spatial pre-fetch may meet the criteria for evaluating fills in a TLB as follows: the TLB may be filled far enough in advance of a predicted TLB miss such as to hide the latency incurred by a page table walk; TLB fills may be initiated at an address predicted to miss; and up to a number "N" of adjacent addresses may be filled. Accordingly, as compared to stream pre-fill, stream pre-fill with spatial pre-fetch may fill N adjacent addresses in the TLB on each access. Thus, stream pre-fill with spatial pre-fetch may combine beneficial aspects of stream pre-fill and fills with spatial pre-fetch as discussed above.

Exemplary embodiments may also include TLB fills for multiple streaming accesses, supported by stride predictors enhanced with filtering capabilities. For example, an exemplary MMU may cater to one or more clients and thereby support multiple address streams. All of the address streams generating accesses to the MMU may not share a common stride value. Therefore, a shared common stride predictor may not be capable of adequately supporting the multiple address streams. In order to support multiple address streams, multiple stride predictors or stride predictors with multiple stride registers may be employed. Accordingly, two or more address streams may be steered to two or more predictors based on certain representative bits in the address streams. Examples of bits in the address streams which may be used to determine the predictor logic that the address stream is steered to include: a logical master ID (or MID) of an originating stream from a given client, a read/write indicator bit, a transaction size indicator bit, etc.

Figure 4:
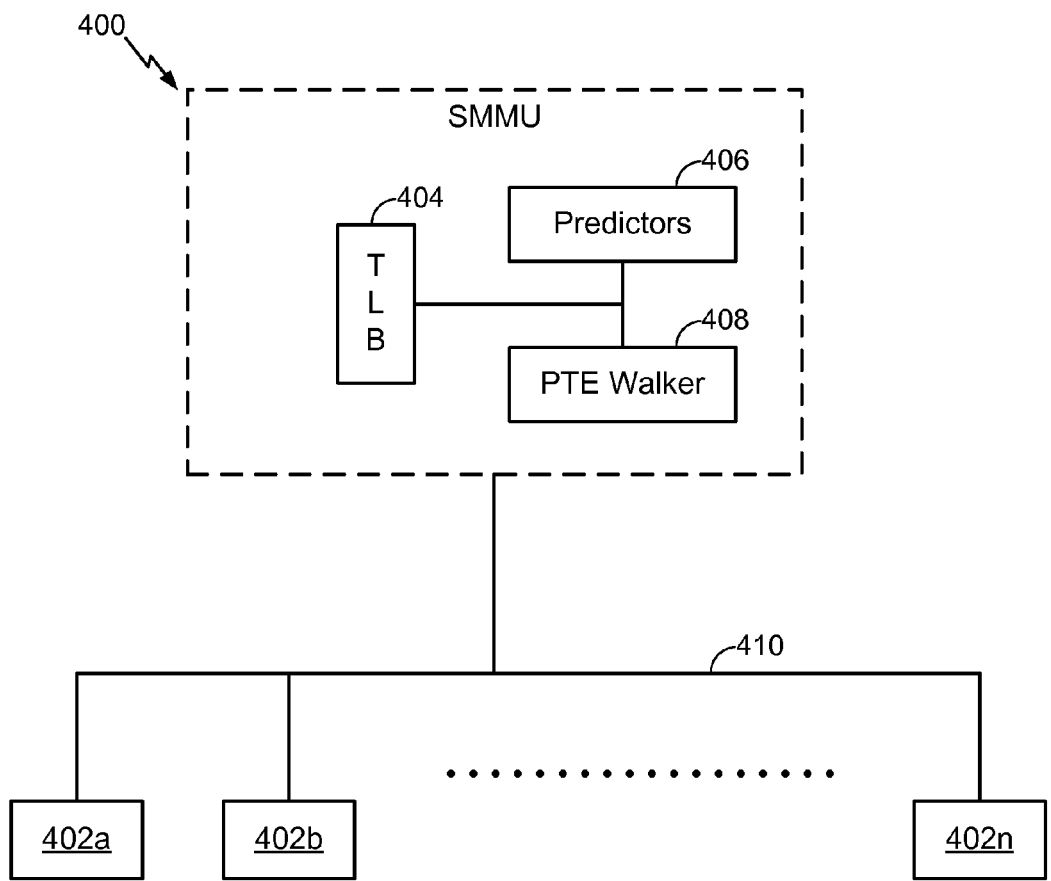
FIG. 4 illustrates an exemplary system MMU with multiple clients transmitting multiple streaming accesses.

With reference now to FIG. 4 an exemplary MMU system employing TLB pre-fill for multiple streaming accesses is illustrated. The multiple streaming accesses may be parallel and/or simultaneous. As shown, a system MMU (SMMU) 400 provides translation services for several multimedia clients, 402*a-n*. Clients 402*a-n* may be any device, including CPUs, and may communicate with SMMU 400 over a shared bus such as bus 410. Each client 402*a-n* may supply an address stream to SMMU 400 for translation. The multiple address streams may not have a same stride value. For example, a first stream (e.g. from client 402*a*) may have a first stride value, wherein the first stream is based on a first hint value corresponding to a first virtual address (which may be received from client 402*a*). Similarly, a second stream (e.g.

from client 402b) may have a second stride value, wherein the second stream is based on a second hint value corresponding to a second virtual address (which may be received from client 402b). SMMU 400 may comprise TLB 404 which may be pre-filled with the first stream simultaneously and/or in parallel with the second stream. Corresponding to the first stream and the second stream, logic for two or more predictors may be present in the block designated as predictors 406 in FIG. 4 to assist TLB 404 in translation of multiple address streams such as the first and second streams. Page table walker 408 may also be configured to support multiple simultaneous and/or parallel operations for obtaining translations (e.g. corresponding to the first and second streams).

Accordingly, the exemplary embodiments described herein may be configured to pre-fill TLBs such that exemplary MMUs may derive improved performance, conserve resource costs and consume less power. As previously described, conventional TLBs may be configured to reduce miss rates for non-streaming accesses by simply increasing the TLB size. However, conventional TLBs cannot accomplish reduced miss rate for streaming accesses even if the TLB size were theoretically infinitely increased. However, exemplary embodiments may be configured to reduce TLB miss rates and may effectively eliminate TLB misses, even in the case of streaming accesses.

Moreover, exemplary embodiments may combine multiple page table walks into a single transaction by using spatial pre-fetch, which can effectively reduce the number of distinct memory transactions in a system. Thus, memory efficiency may be improved and resource contention may be reduced, thereby also improving the performance of system components which may not directly require TLB accesses.

Figure 5:
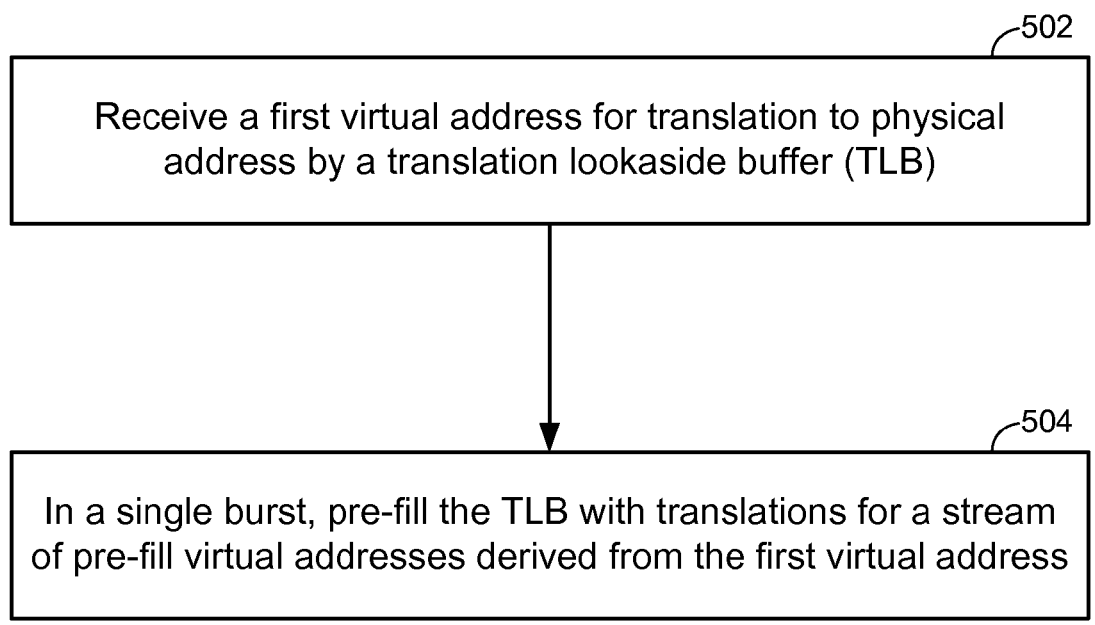
FIG. 5 illustrates a flow diagram for a method of populating a TLB according to exemplary embodiments.

It will be appreciated that embodiments include various methods for performing the processes, functions and/or algorithms disclosed herein. For example, as illustrated in FIG. 5, an embodiment can include a method of populating a translation lookaside buffer (TLB) (e.g. active TLB 206 and future TLB 208), the method comprising: receiving a first virtual address for translation to physical address (e.g. virtual address 202 and physical address 204) by the TLB—Block 502; and in a single burst, pre-filling the TLB with translations for a stream of pre-fill virtual addresses (e.g. pre-filling future TLB 208 by stride predictor 216 and page table walker 220) derived from the first virtual address—Block 504.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Figure 6:
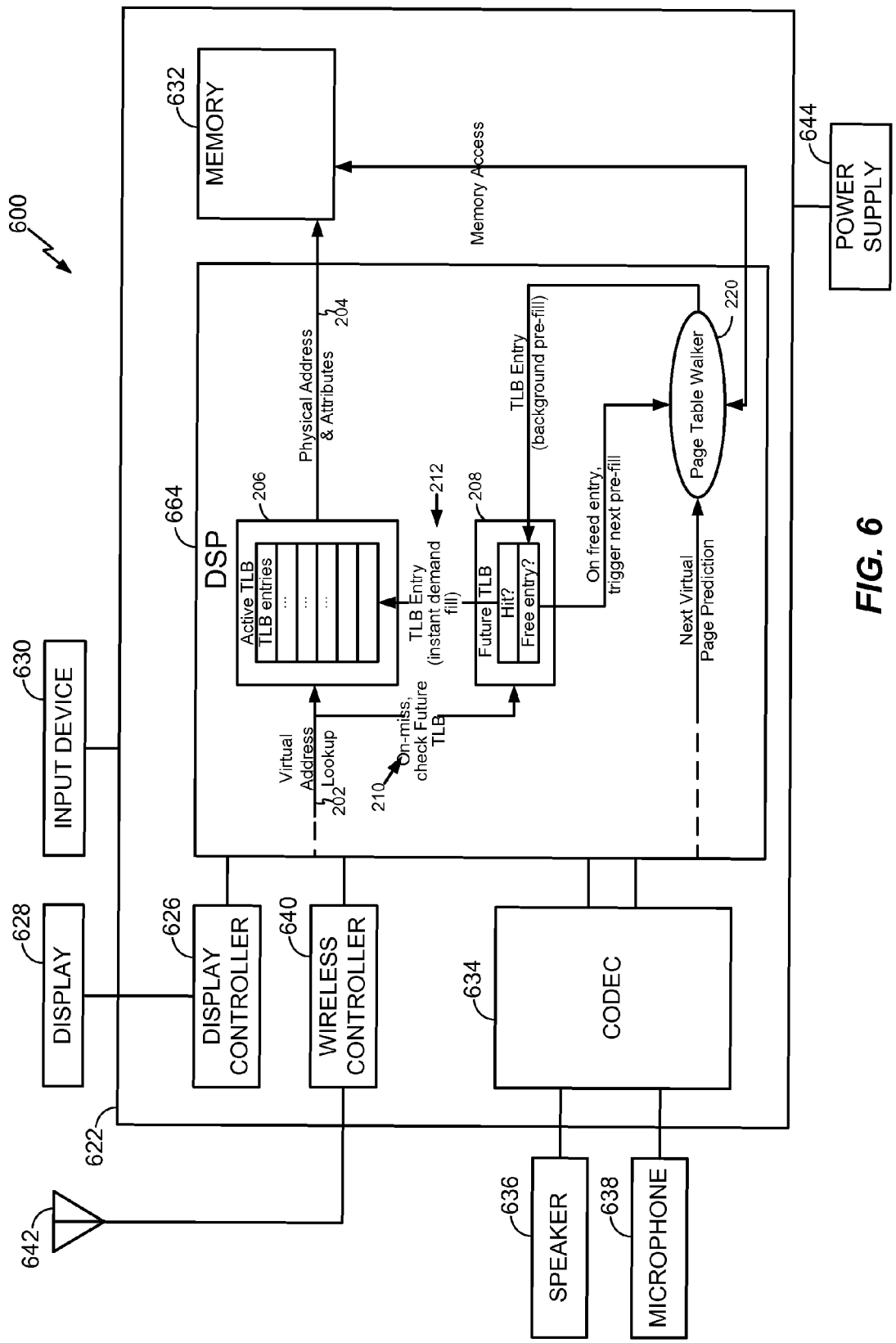

Referring to FIG. 6, a block diagram of a particular illustrative embodiment of a wireless device that includes a multi-core processor configured according to exemplary embodiments is depicted and generally designated 600. The device 600 includes a digital signal processor (DSP) 664, which may comprise logic such as active TLB 206, future TLB 208, page table walker 220, etc of FIG. 2, which may be coupled to memory 632 as shown. Virtual address 202 and next virtual page prediction (hint value) may be received from external devices described below. For example, FIG. 6 also shows an external device such as display controller 626 that is coupled to DSP 664 and to display 628. An external device such as coder/decoder (CODEC) 634 (e.g., an audio and/or voice CODEC) can also be coupled to DSP 664. Other components/external devices, such as wireless controller 640 (which may include a modem) are also illustrated. Speaker 636 and microphone 638 can be coupled to CODEC 634. FIG. 6 also indicates that wireless controller 640 can be coupled to wireless antenna 642. In a particular embodiment, DSP 664, display controller 626, memory 632, CODEC 634, and wireless controller 640 are included in a system-in-package or system-on-chip device 622.

In a particular embodiment, input device 630 and power supply 644 are coupled to the system-on-chip device 622. Moreover, in a particular embodiment, as illustrated in FIG. 6, display 628, input device 630, speaker 636, microphone 638, wireless antenna 642, and power supply 644 are external to the system-on-chip device 622. However, each of display 628, input device 630, speaker 636, microphone 638, wireless antenna 642, and power supply 644 can be coupled to a component of the system-on-chip device 622, such as an interface or a controller.

It should be noted that although FIG. 6 depicts a wireless communications device, DSP 664 and memory 632 may also be integrated into a set-top box, a music player, a video player, an entertainment unit, a navigation device, a personal digital assistant (PDA), a fixed location data unit, or a computer. A processor (e.g., DSP 664) may also be integrated into such a device.

Accordingly, an embodiment of the invention can include a computer readable media embodying a method of populating a TLB by pre-filling the TLB. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of populating a translation lookaside buffer (TLB), the method comprising:
   receiving a first virtual address for translation to physical address by the TLB;
   receiving a second virtual address for translation to physical address by the TLB; and
   in a single burst, pre-filling the TLB with translations for a first stream of one or more pre-fill virtual addresses derived from the first virtual address, and pre-filling the TLB with translations for a second stream of one or more pre-fill virtual addresses derived from the second virtual address, wherein pre-filling the TLB with translations for the second stream is performed simultaneously and/or in parallel with pre-filling the TLB with translations for the first stream.

2. The method of claim 1, wherein the first virtual address is derived from a first hint address value received from a first external device.

3. The method of claim 1, wherein the first stream of one or more pre-fill virtual addresses comprises virtual addresses that are derived from the first virtual address based on a first programmable stride value.

4. The method of claim 3, wherein the first programmable stride value is dynamically determined by software.

5. The method of claim 3, wherein the first programmable stride value is a predetermined constant.

6. The method of claim 3, wherein the first programmable stride value is determined by analyzing patterns for TLB misses.

7. The method of claim 3, wherein the first programmable stride value is based on a hint value derived from an external device.

8. The method of claim 1, wherein the first stream of one or more pre-fill virtual addresses are adjacent to the first virtual address.

9. The method of claim 1, wherein pre-filling the TLB with translations for the first stream of one or more pre-fill virtual addresses is performed before the TLB receives demand requests for address translations corresponding to the one or more pre-fill virtual addresses.

10. The method of claim 1, wherein the first virtual address causes a miss in the TLB.

11. The method of claim 1, wherein the second virtual address is derived from a second hint address value received from a second external device.

12. An apparatus comprising:
   a translation lookaside buffer (TLB) configured to receive:
      a first stream of one or more pre-fill virtual addresses derived from a first virtual address for translation to physical address by the TLB; and
      a second stream of one or more pre-fill virtual addresses derived from a second virtual address for translation to physical address by the TLB;
   wherein the TLB is configured to be pre-filled with translations for the first stream simultaneously and/or in parallel with translations for the second stream, in a single burst.

13. The apparatus of claim 12, wherein the first stream of one or more pre-fill virtual addresses comprises virtual addresses that are derived from the first virtual address based on a programmable stride value.

14. The apparatus of claim 13, wherein the programmable stride value is based on a first hint value derived from a first external device.

15. The apparatus of claim 12, wherein the logic is configured to pre-fill the TLB with the first stream of one or more pre-fill virtual addresses before demand requests for address translation corresponding to the first stream of one or more pre-fill virtual addresses are received by the TLB.

16. The apparatus of claim 12, wherein the first virtual address causes a miss in the TLB.

17. The apparatus of claim 12, integrated in a semiconductor die.

18. The apparatus of claim 12, integrated into a device selected from the group consisting of a set top box, music player, video player, entertainment unit, navigation device, communications device, personal digital assistant (PDA), fixed location data unit, and a computer.

19. A method of populating a translation lookaside buffer (TLB), the method comprising:
   populating a first set of entries of the TLB with address translations for a first stream of virtual addresses generated at a first rate; and
   populating a second set of entries of the TLB with address translations for a second stream of virtual addresses generated at a second rate.

20. The method of claim 19, wherein the first stream comprises virtual addresses corresponding to demand requests received by the TLB and the second stream comprises virtual addresses for pre-filling the TLB before demand requests for the second stream of virtual addresses is received by the TLB.

21. The method of claim 19, wherein a ratio of the first rate and the second rate is determined based on a desired balance between the number of entries in the first set and the number of entries in the second set.

22. The method of claim 19, further comprising tagging the first set and the second set with distinct indicators.

23. The method of claim 19, wherein the first stream and the second stream are generated by a same device operatively coupled to the TLB.

24. The method of claim 23, wherein the first stream and the second stream are communicated to the TLB from the same device on a common channel.

25. The method of claim 23, wherein the first stream and the second stream are communicated to the TLB from the same device on separate dedicated channels.

26. The method of claim 19, wherein the first stream and the second stream are generated by separate devices operatively coupled to the TLB.

27. An apparatus comprising:
   a translation lookaside buffer (TLB); and
   an address generation unit (AGU) configured to:
      generate a first stream of virtual addresses at a first rate for translation in the TLB; and
      generate a second stream of virtual addresses at a second rate for translation in the TLB.

28. The apparatus of claim 27, wherein the first stream comprises virtual address corresponding to demand requests generated for the TLB and the second stream comprises virtual addresses for pre-filling the TLB before demand requests for the second stream of virtual addresses are generated for the TLB.

29. The apparatus of claim 27, wherein the first rate and second rate are determined based on a desired ratio.

30. The apparatus of claim 29, wherein the desired ratio is derived from a programmable register.

31. The apparatus of claim 27, wherein the second rate is determined based on a virtual page size.

32. The apparatus of claim 31, wherein the virtual page size is programmable via a register.

33. The apparatus of claim 27, wherein one or more virtual addresses in the second stream have a desired offset from virtual addresses in the first stream.

34. The apparatus of claim 33, wherein the desired offset value is one of a positive value or a negative value.

35. The apparatus of claim 33, wherein the desired offset value is derived from a programmable register.

36. A system for populating a translation lookaside buffer (TLB), the system comprising:
   means for receiving a first virtual address for translation to physical address by the TLB;
   means for receiving a second virtual address for translation to physical address by the TLB; and
   means for pre-filling the TLB with translations for a first stream of one or more pre-fill virtual addresses derived from the first virtual address simultaneously and/or in parallel with translations for a second stream of one or more pre-fill virtual addresses derived from the second virtual address, in a single burst.

37. A system for populating a translation lookaside buffer (TLB), the system comprising:
   means for populating a first set of entries of the TLB with address translations for a first stream of virtual addresses generated at a first rate; and
   means for populating a second set of entries of the TLB with address translations for a second stream of virtual addresses generated at a second rate.

38. A non-transitory computer-readable storage medium comprising code, which, when executed by a processor, causes the processor to perform operations for populating a translation lookaside buffer (TLB), the non-transitory computer-readable storage medium comprising:
   code for receiving a first virtual address for translation to physical address by the TLB;
   code for receiving a second virtual address for translation to physical address by the TLB; and
   code for pre-filling the TLB with translations for a first stream of one or more pre-fill virtual addresses derived from the first virtual address simultaneously and/or in parallel with translations for a second stream of one or more pre-fill virtual addresses derived from the second virtual address, in a single burst.

39. A non-transitory computer-readable storage medium comprising code, which, when executed by a processor, causes the processor to perform operations for populating a translation lookaside buffer (TLB), the non-transitory computer-readable storage medium comprising:
   code for populating a first set of entries of the TLB with address translations for a first stream of virtual addresses generated at a first rate; and
   code for populating a second set of entries of the TLB with address translations for a second stream of virtual addresses generated at a second rate.

* * * * *